(12) United States Patent
Ahn et al.

(10) Patent No.: US 11,293,616 B1
(45) Date of Patent: Apr. 5, 2022

(54) LIGHTING APPARATUS OF GRILLE FOR AUTOMOBILE

(71) Applicants: Hyundai Motor Company, Seoul (KR); Kia Corporation, Seoul (KR); SL Corporation, Daegu (KR)

(72) Inventors: Byoung Suk Ahn, Gwacheon-si (KR); Jung Wook Lim, Seoul (KR); Ki Hong Lee, Seoul (KR); Sung Ho Park, Seoul (KR); Seung Sik Han, Hwaseong-si (KR); Jung Hee Seo, Gyeongsan-si (KR); Kyeong Jin Ahn, Gyeongsan-si (KR); Jin Hwan Kim, Gyeongsan-si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/337,087

(22) Filed: Jun. 2, 2021

(30) Foreign Application Priority Data

Sep. 28, 2020 (KR) ........................ 10-2020-0126001

(51) Int. Cl.
*F21S 41/50* (2018.01)
*B60Q 1/28* (2006.01)
*F21S 41/32* (2018.01)
*F21S 41/275* (2018.01)

(52) U.S. Cl.
CPC ................ *F21S 41/50* (2018.01); *B60Q 1/28* (2013.01); *F21S 41/275* (2018.01); *F21S 41/322* (2018.01)

(58) Field of Classification Search
CPC ........ F21S 41/275; F21S 41/322; F21S 41/50; B60Q 1/28
See application file for complete search history.

(56) References Cited

U.S. PATENT DOCUMENTS 10,920,950 B1 * 2/2021 Glickman ............ B60Q 1/2696

FOREIGN PATENT DOCUMENTS

| JP | 6081784 B2 | 2/2017 |
| JP | 2017-228675 A | 12/2017 |
| KR | 10-2017-0062405 A | 6/2017 |
| WO | WO 2019/165018 A1 | 8/2019 |

* cited by examiner

*Primary Examiner* — Thomas M Sember
(74) *Attorney, Agent, or Firm* — Morgan, Lewis & Bockius LLP

(57) ABSTRACT

A lighting apparatus of a grille for an automobile, may upgrade the grille by turning on light through the grille of the vehicle and making the light spread softly in the rear of the grille, and which is favorable to the layout through reduction of a lighting structure of the light.

19 Claims, 7 Drawing Sheets

GRILLE PART BONDING (FUSION)

LIGHTING APPARATUS OF GRILLE FOR AUTOMOBILE

CROSS REFERENCE TO RELATED APPLICATION

The present application claims priority to Korean Patent Application No. 10-2020-0126001 filed on Sep. 28, 2020, the entire contents of which is incorporated herein for all purposes by this reference.

BACKGROUND OF THE INVENTION

Field of the Invention

The present invention relates to a lighting apparatus of a grille for an automobile, in which light is turned on through the grille.

Description of Related Art

On a front portion of a vehicle, a radiator grille is provided for aerodynamics and engine cooling, and even to a vehicle which is not an internal combustion engine vehicle, a grille is applied for design elements of the front portion of the vehicle.

Such a grille is a very important factor of the design of the vehicle front portion, and productivity of the vehicle is improved by upgrading the grille through irradiation of light through the grille.

Generally, for light irradiation through the grille, lights are installed in the rear of the grille for the light irradiation to the front of the grille, but it is required to secure an installation space of a light source.

Furthermore, since the light is heterogeneously irradiated from holes of the grille, the design of the grille is hindered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lighting apparatus of a grille for an automobile, which upgrades the grille by turning on light through the grille of the vehicle and making the light spread softly in the rear of the grille, and which is favorable to the layout through reduction of a lighting structure of the light.

According to various exemplary embodiments of the present invention to achieve the above object, a lighting apparatus of a grille for an automobile includes a grille panel including a grille portion including a plurality of pattern holes; a lens panel including a lens portion mounted at a rear end portion of the grille panel and equally formed with a shape of a partial area or a whole area of the grille portion, and configured to make light move inside thereof and to make a portion of the light emitted to outside thereof when the light is incident thereto; and a housing including a support portion mounted on a rear side of the lens panel and equally formed with the lens panel, and provided with a light source irradiating the lens panel with the light.

The grille portion is formed to have a width being smaller than a width of the lens portion, and the light moving through the lens portion is emitted around the grille portion.

The lens portion includes an incident portion formed on a side of the lens portion to make the light of the light source penetrate and be incident to inside of the lens portion.

The incident portion includes an optic portion for light diffusion, wherein the optic portion has a plurality of projections or grooves.

An optic portion for light emission including a plurality of projections or grooves is formed on a rear side of the lens portion.

The plurality of projections or grooves of the optic portion for light emission have intervals being gradually narrowed or sizes being gradually increased in a direction in which the optic portion gets away from the incident portion.

The grille portion extends in an intersectional direction and forms a plurality of pattern holes, the lens portion is formed to be crossed as the lens portion is equally formed with a shape of the grille portion, and the incident portion is formed at an end portion of each lens portion and includes one lens portion or a plurality of lens portions.

One or a plurality of light sources are provided on respective incident portions in accordance with the lens portions extending from the respective incident portions.

A light guide portion extending collinearly with an extension direction of the lens portion is formed on the incident portion, and the light source is disposed to face the light guide portion and is installed so that an optical axis of the light is in a same direction as the extension direction of the lens portion.

The incident portion extends from the lens portion in an orthogonal direction thereof, and has one side to which the light of the light source is incident and the other side on which a total reflection surface totally reflecting the light toward the lens portion is formed.

The grille portion is coupled to a front side of the lens portion, the support portion is coupled to a rear side of the lens portion, and the grille portion and the support portion are disposed not to overlap each other in back and forth directions of the lens portion.

The grille portion is laser-fused to the lens portion to avoid the support portion in a rear of the lens portion, and the support portion is laser-fused to the lens portion to avoid the grille portion in a front of the lens portion.

The support portion includes a first end portion and a second end portion disposed to be spaced from each other in a width direction of the lens portion and coupled to the rear side of the lens portion, and the first end portion and the second end portion are formed to be recessed toward an opposite side of the lens portion.

The lens portion includes an optic portion for light reflection formed on a portion matching recessed portions of the first end portion and the second end portion and including a plurality of projections or grooves.

The grille portion is disposed between the first end portion and the second end portion of the support portion on the front side of the lens portion and coupled to the lens portion.

The support portion includes connection end portions coupled to both end portions in a width direction of the lens portion on a rear side of the lens portion and a recessed end portion forming a recessed space by connecting the respective connection end portions.

The lens portion includes an optic portion for light reflection formed on a portion matching the recessed end portion and including a plurality of projections or grooves.

The lighting apparatus of the grille for the automobile including the above-described structure upgrades the grille by turning on the light through the grille of the vehicle and making the light spread softly in the rear of the grille, and is favorable to the layout through reduction of the lighting structure of the light.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
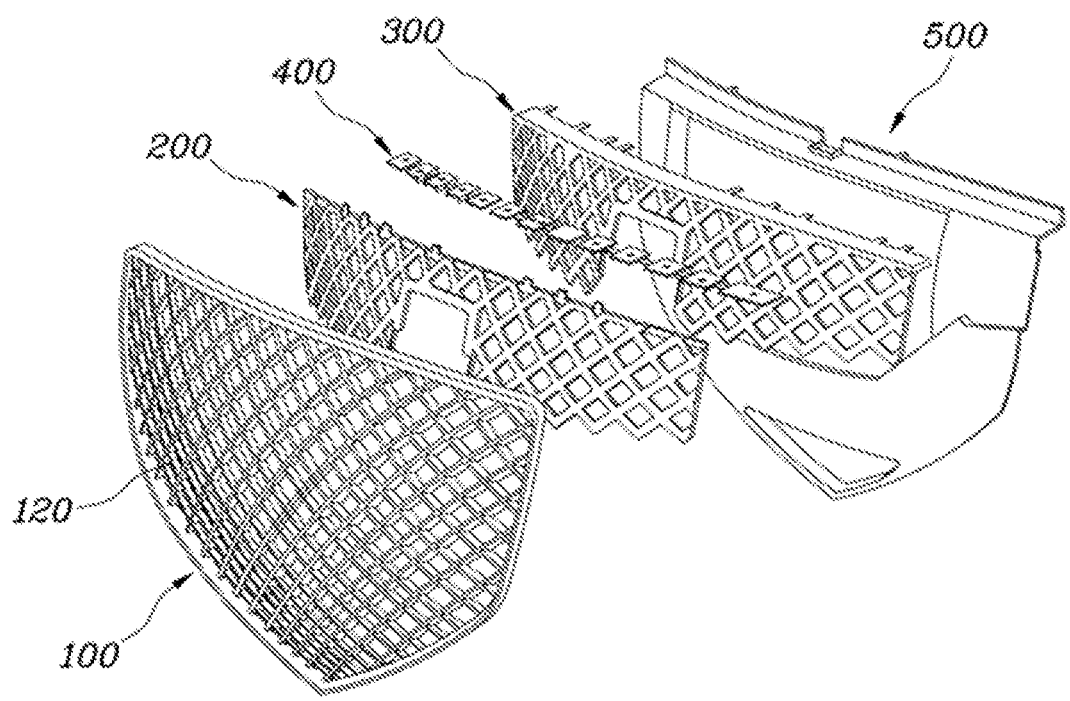
FIG. 1 is a view exemplarily illustrating a lighting apparatus of a grille for an automobile according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lighting apparatus of a grille for an automobile according to exemplary embodiments of the present invention will be described with reference to the accompanying drawings.

Figure 2:
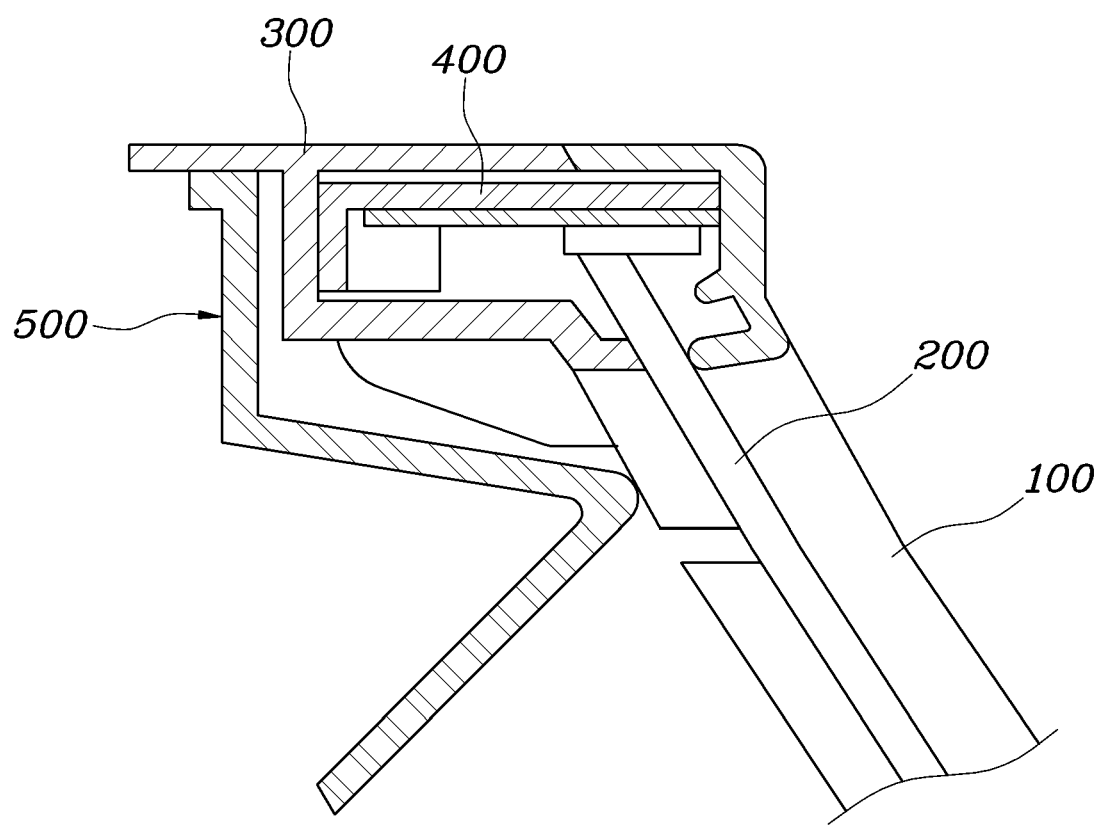
FIG. 2 is a side cross-sectional view of the lighting apparatus of the grille for the automobile illustrated in FIG. 1.
Figure 3:
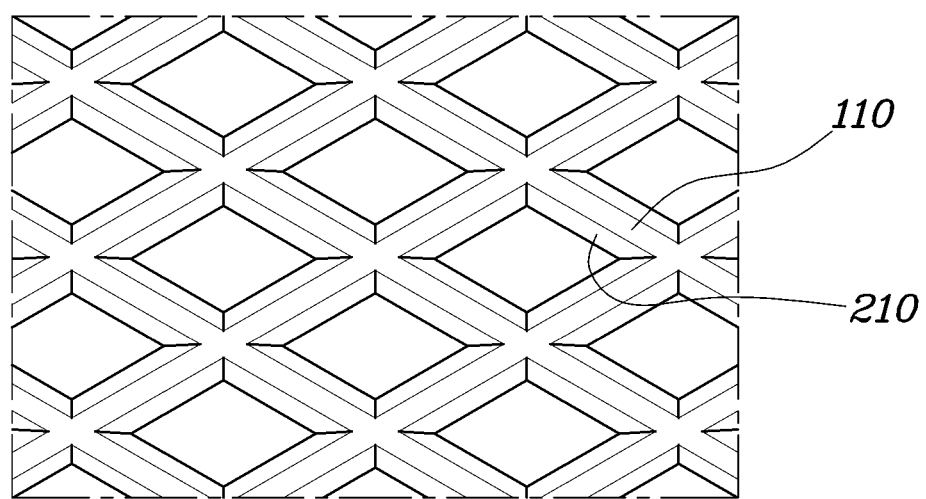
FIG. 3 is a view exemplarily illustrating a grille panel and a lens panel of the lighting apparatus of the grille for the automobile illustrated in FIG. 1.
Figure 6:
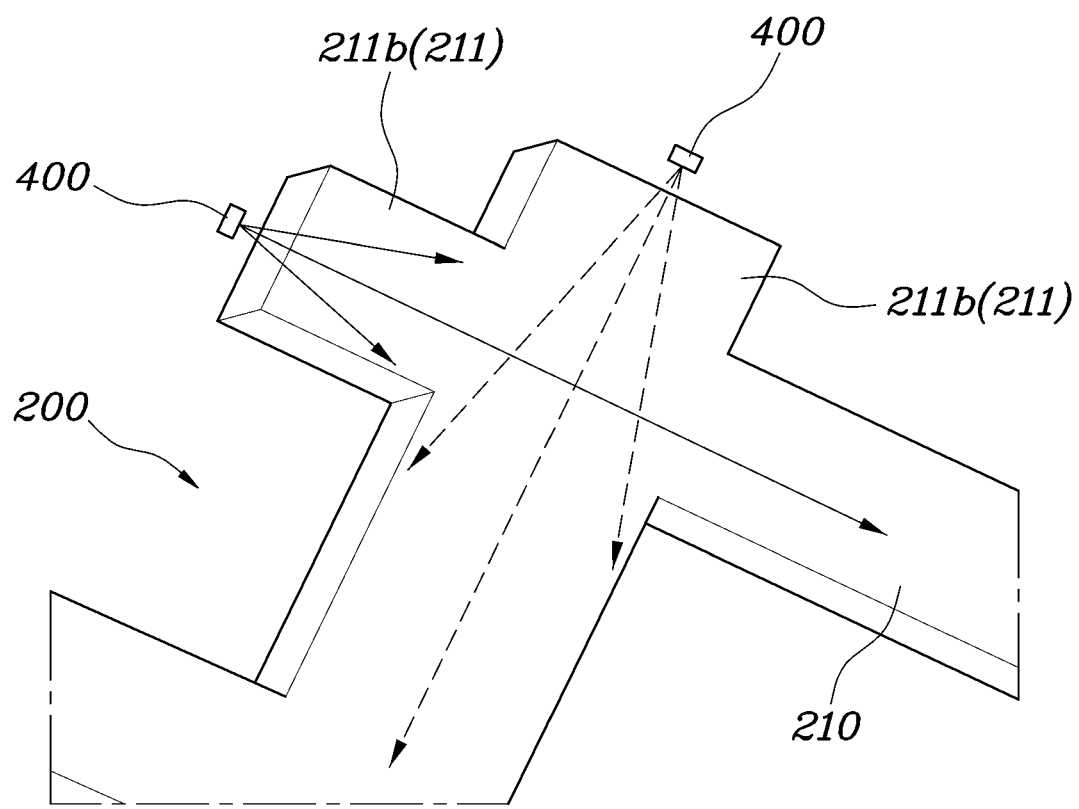
Figure 7:
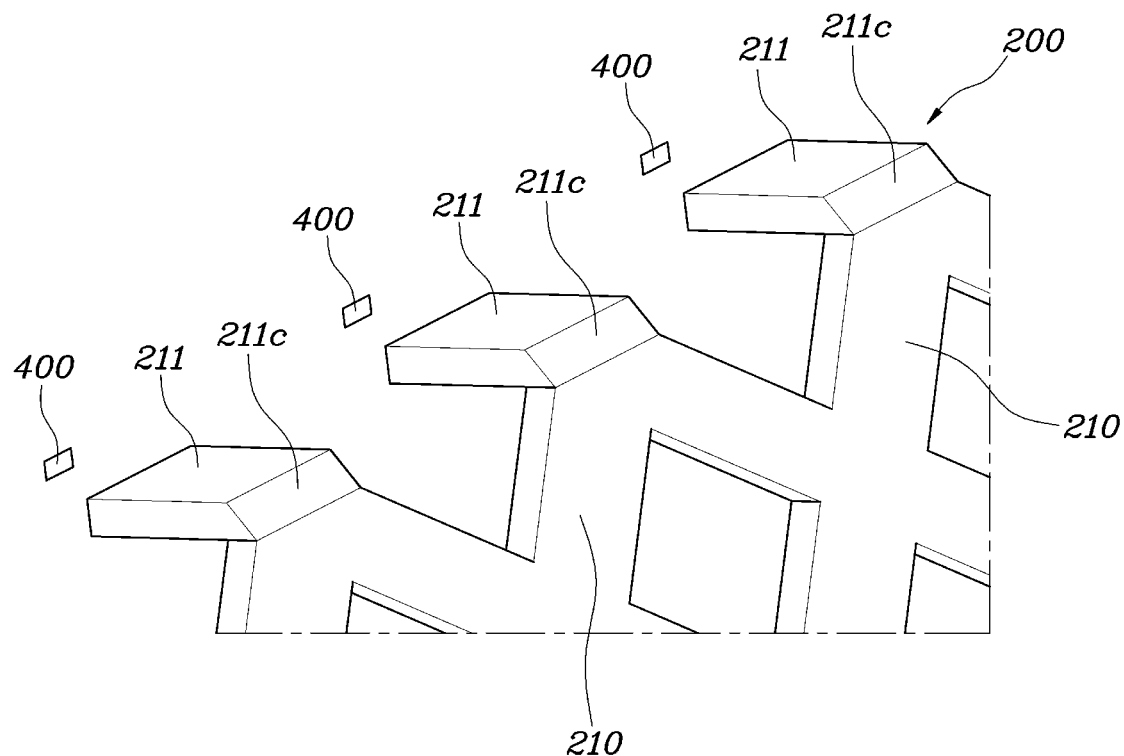
Figure 8:
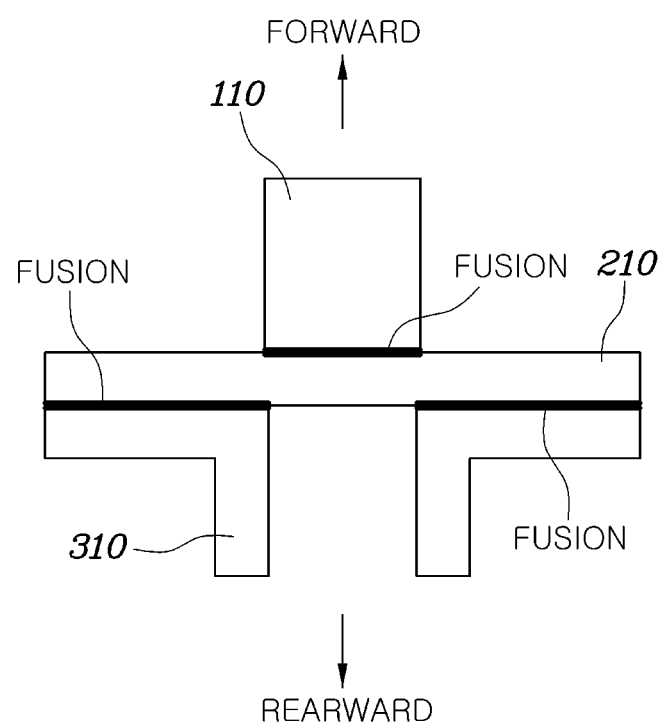
FIG. 8 is a view exemplarily illustrating an exemplary embodiment according to a connection structure of a grille panel, a lens panel, and a housing.
Figure 9:
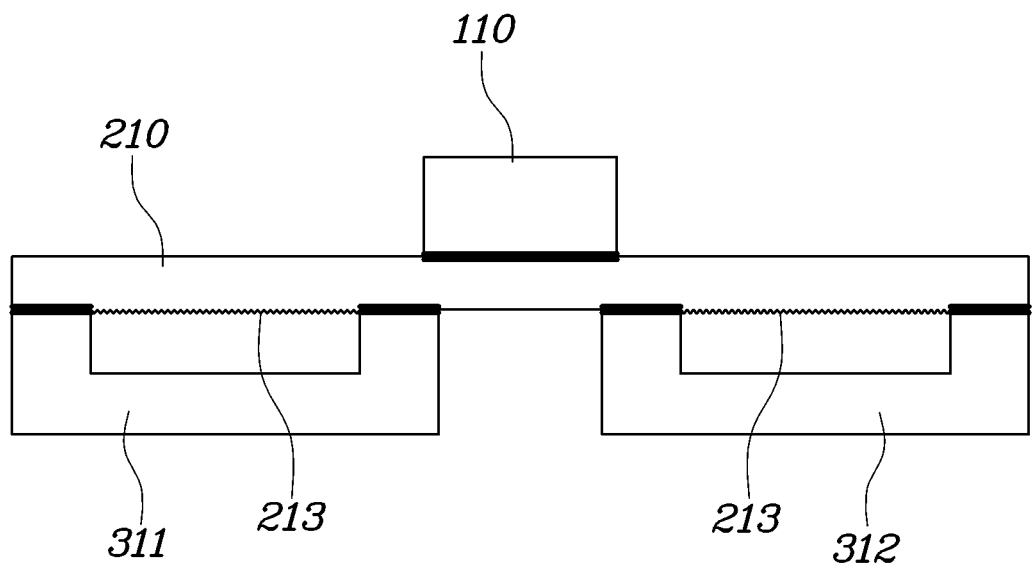
FIG. 9 is a view exemplarily illustrating another exemplary embodiment according to a connection structure of a grille panel, a lens panel, and a housing.
Figure 10:
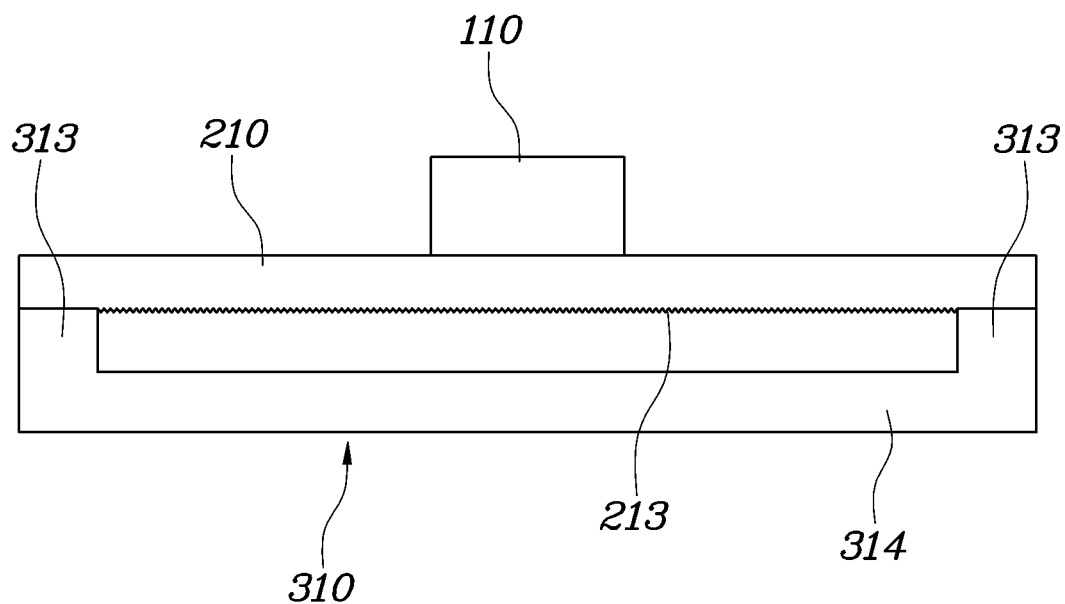
FIG. 10 is a view exemplarily illustrating various exemplary embodiments according to a connection structure of a grille panel, a lens panel, and a housing.

FIG. 1 is a view exemplarily illustrating a lighting apparatus of a grille for an automobile according to various exemplary embodiments of the present invention, FIG. 2 is a side cross-sectional view of the lighting apparatus of the grille for the automobile illustrated in FIG. 1, FIG. 3 is a view exemplarily illustrating a grille panel and a lens panel of the lighting apparatus of the grille for the automobile illustrated in FIG. 1, FIG. 4, FIG. 5, FIG. 6 and FIG. 7 are views exemplarily illustrating respective embodiments of an incident portion of the lighting apparatus of the grille for the automobile illustrated in FIG. 1, FIG. 8 is a view exemplarily illustrating an exemplary embodiment according to a connection structure of a grille panel, a lens panel, and a housing, FIG. 9 is a view exemplarily illustrating another exemplary embodiment according to a connection structure of a grille panel, a lens panel, and a housing, and FIG. 10 is a view exemplarily illustrating various exemplary embodiments according to a connection structure of a grille panel, a lens panel, and a housing.

As illustrated in FIG. 1 and FIG. 2, a lighting apparatus of a grille for an automobile according to various exemplary embodiments of the present invention includes a grille panel 100 including a grille portion 110 forming a plurality of pattern holes 120; a lens panel 200 including a lens portion 210 mounted at a rear end portion of the grille panel 100 and equally formed with a shape of a partial area or a whole area of the grille portion 110, and configured to make light move inside thereof and to make a portion of the light emitted to outside thereof when the light is incident thereto; and a housing 300 including a support portion 310 mounted on a rear side of the lens panel 200 and equally formed with the lens panel 200, and provided with a light source 400 irradiating the lens panel 200 with the light.

In various exemplary embodiments of the present invention, the grille panel 100, the lens panel 200, and the housing 300 are configured from front to rear of the vehicle, and a cover panel 500 forming a vehicle front portion may be further provided in the rear of the housing 300. Here, the grille panel 100 forms the plurality of pattern holes 120 for air circulation from the vehicle front portion to internal and external portions through the grille portion 110, and the design of the grille panel 100 is determined in accordance with the plurality of pattern holes 120. As illustrated in the drawings, such pattern holes 120 of the grille panel 100 may be formed not only in a rhombus shape but also in an irregular shape, such as a circle or a polygon in accordance with a demanded design.

The lens portion 210 may be disposed at the rear end portion of the grille panel 100 and may be equally formed with the shape of the partial area or the whole area of the grille portion 110. Furthermore, the lens portion 210 includes a light guide which makes the incident light move inside and makes a portion of the light emitted to outside. Accordingly, in case that the lens portion 210 is equally formed with the shape of the partial area of the grille portion 110, the light is emitted from the partial area of the grille panel 100, whereas in case that the lens portion 210 is equally formed with the shape of the whole area of the grille portion 110, the light is emitted from the whole area of the grille panel 100. This may be determined in accordance with the design element of the grille panel 100.

The housing 300 mounted on the rear side of the lens portion 210 is equally formed with the lens panel 200. In the housing 300, a light source 400 irradiating the lens portion 210 with the light is provided, and the housing 300 reflects the light moving rearward among the light being emitted from the lens portion 210 and emits the reflected light toward the grille panel 100 to improve light efficiency.

Through this, according to various exemplary embodiments of the present invention, when the light is irradiated from the light source 400, the light is emitted through the lens panel 200 disposed in the rear of the grille panel 100, and then spreads to the front of the grille panel 100, so that the grille panel 100 is further upgraded. Furthermore, the light-emitting efficiency of the light being emitted from the lens panel 200 is secured by the housing 300.

The present invention as described above will be described in detail as follows.

As illustrated in FIG. 3, the grille portion 110 is formed to have a width being smaller than a width of the lens portion 210, and the light moving through the lens portion 210 may be emitted around the grille portion 110. That is, since the width of the grille portion 110 constituting the grille panel 100 is set to be smaller than the width of the lens portion 210 constituting the lens panel 200, the lens portion 210 is exposed to the rear of the grille portion 110 when the grille panel 100 is viewed from the front. Due to this, when the light of the light source 400 is irradiated, the light through the lens portion 210 is emitted around the grille portion 110, and thus the lighting effect of the grille panel 100 is improved.

Meanwhile, an incident portion 211 may be formed on the lens portion 210 to make the light of the light source penetrate and be incident to the inside of the lens portion 210.

Figure 4:
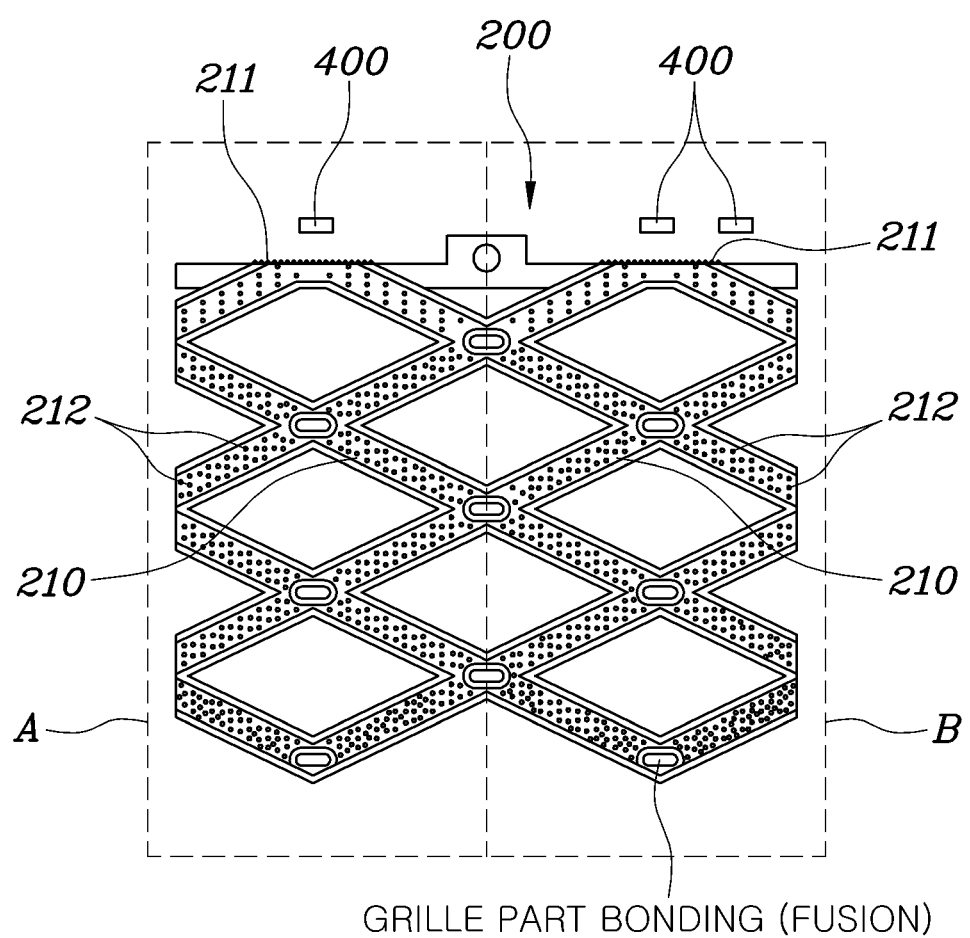
FIG. 4, FIG. 5, FIG. 6 and FIG. 7 are views exemplarily illustrating respective embodiments of an incident portion of the lighting apparatus of the grille for the automobile illustrated in FIG. 1.
Figure 5:
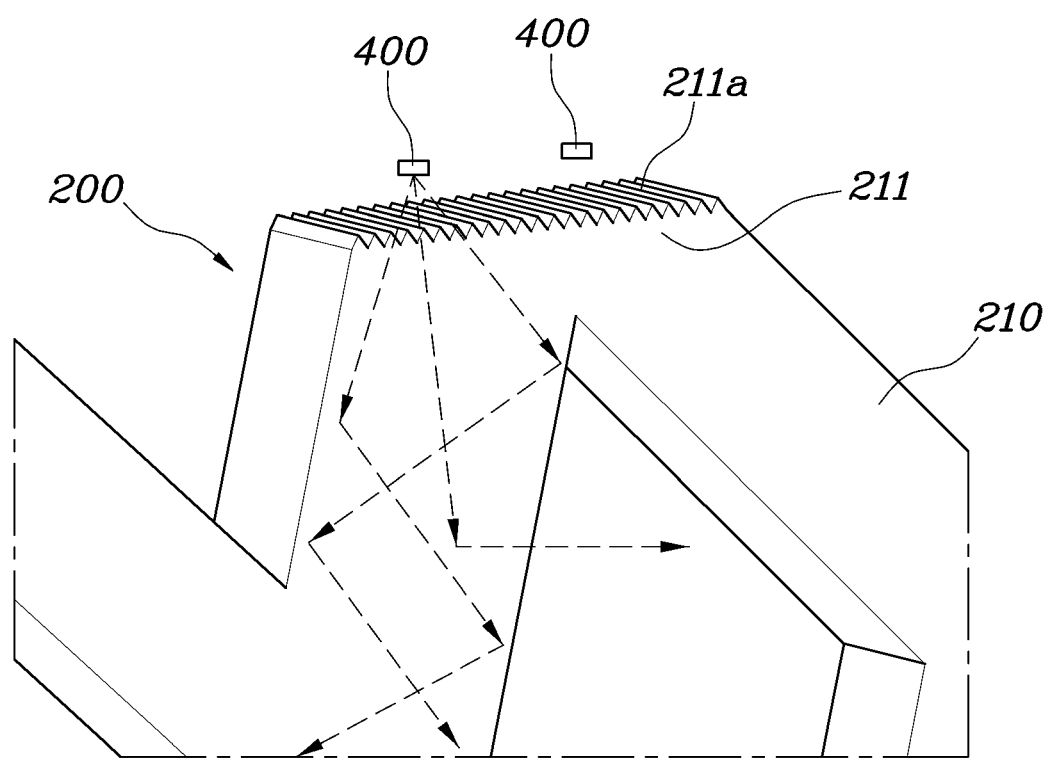

As shown in FIG. 4 and FIG. 5, since the incident portion 211 making the light of the light source 400 incident is formed on the lens portion 210, the light of the light source 400 can pass through the incident portion 211, and can move inside the lens portion 210. Accordingly, the incident portion 211 may be disposed adjacent to the light source 400, and is configured to be transparent so that the light irradiated from the light source 400 can pass smoothly through the incident portion 211.

A plurality of incident portions 211 may be provided at end portions of respective lens portions 210 in the lens panel 200, and a plurality of light sources 400 may be provided to match the respective incident portions 211. Furthermore, the plurality of incident portions 211 and light sources 400 may be configured in up and down directions or left and right directions of the lens panel 200, and the number of light sources 400 and incident portions 211 may be determined in accordance with a required amount of light emission of the lens panel 200.

As can be shown in FIG. 5, an optic portion 211a for light diffusion including a plurality of projections or grooves to be in a serrated shape may be formed on the incident portion 211, and may make the light irradiated from the light source 400 scattered and incident to the lens portion 210. Due to this, since the light irradiated from the light source 400 is scattered by the optic portion 211a for light diffusion of the incident portion 211 and moves to the lens portion 210, the light can smoothly move along the extension direction of the lens portion 210 through scattering inside the lens portion 210, and the light emission through the lens portion 210 can be smoothly performed.

Meanwhile, as illustrated in FIG. 4, an optic portion 212 for light emission including a plurality of projections or grooves may be formed on the rear side of the lens portion 210. According to various exemplary embodiments of the present invention, the light may be emitted to the front of the grille portion 110. The light irradiated from the light source 400 may be emitted through the lens portion 210, but the amount of light emission forward may be secured.

Accordingly, since the optic portion 212 for light emission is formed on the rear side of the lens portion 210, the light moving inside the lens portion 210 is diffused forward by the plurality of projections or grooves constituting the optic portion 212 for light emission, and thus the amount of light being emitted to the front of the grille portion 110 is secured.

Furthermore, since the optic portion 212 for light emission is formed on the rear side of the lens portion 210, the amount of light emission through the lens portion 210 is gradually reduced in a direction in which the optic portion 212 gets away from the incident portion 211, and thus the lens portion 210 may form a gradation light emission. That is, in a case of a region close to the incident portion 211 of the lens portion 210, the amount of light diffusion by the optic portion 212 for light emission is increased, whereas in case that the optic portion 212 for light emission gets away from the incident portion 211, the light moving inside the lens portion 210 is decreased, and thus the amount of light diffusion by the optic portion 212 for light emission is decreased. Due to this, the lens portion 210 forms a gradation light emission whereby the brightness is decreased in the direction in which the optic portion 212 gets away from the incident portion 211. For this, the optic portion 212 for light emission may be formed to have the plurality of projections or grooves at equal intervals and with equal sizes.

Meanwhile, the plurality of projections or grooves of the optic portion 212 for light emission may have intervals being gradually narrowed or sizes being gradually increased in a direction in which the optic portion 212 gets away from the incident portion 211. That is, in a case of the region close to the incident portion 211 of the lens portion 210, since the plurality of projections or grooves constituting the optic portion 212 for light emission are distributed at wide intervals and the sizes of the plurality of projections or grooves are decreased, the amount of light diffusion by the optic portion 212 for light emission is decreased. However, as the lens portion 210 gets away from the incident portion 211, the plurality of projections or grooves constituting the optic portion 212 for light emission are distributed at narrow intervals and the sizes of the projections or grooves are increased, and thus the amount of light diffusion by the optic portion 212 for light emission is increased.

Due to this, the lens portion 210 makes the amount of light emission uniform as a whole by intentionally decreasing the amount of light emission in the region close to the incident portion 211 to which the light of the light source 400 is incident and by increasing the amount of light emission in the direction in which it gets away from the incident portion 211.

Meanwhile, the grille portion 110 extends in an intersectional direction and forms a plurality of pattern holes 120, the lens portion 210 is formed to be crossed as the lens portion 210 is equally formed with the shape of the grille portion 110, and the incident portion 211 is formed at an end portion of each lens portion 210 and includes one lens portion 210 or a plurality of lens portions 210. Here, one or a plurality of light sources 400 are provided on respective incident portions 211 in accordance with the lens portions 210 extending from the respective incident portions 211.

That is, as shown in FIG. 4, the lens portion 210 has a shape extending in a crossing direction in accordance with the shape of the grille portion 110. Accordingly, the incident portion 211 may include all lens portions 210 extending in different directions or to include any one lens portion 210 only. Furthermore, only one light source 400 may be provided regardless of the number of lens portions 210 included in the respective incident portions 211, or a plurality of light sources 400, the number of which is equal to the number of grille portions 110, may be provided.

As described above, as can be viewed from one of FIG. 4, in case that a plurality of lens portions 210 extend on the incident portion 211 and the light is irradiated onto the incident portion 211 through one light source 400, the number of light sources 400 is decreased, and effects of installation space reduction and manufacturing cost saving occur. Meanwhile, as can be viewed from B of FIG. 4, in case that a plurality of lens portions 210 extend on the incident portion 211 and a plurality of light sources 400 are provided by respective lens portions 210, the quantity of light moving to the lens portions 210 can be secured, and sufficient light moves by respective lens portions 210, so that the light emission effect through the lens portions 210 can be improved. Such embodiments may be determined in accordance with the amount of light emission through the lens portions 210.

Meanwhile, as illustrated in FIG. 6, a light guide portion 211b extending collinearly with the extension direction of the lens portion 210 is formed on the incident portion 211, and the light source 400 is disposed to face the light guide portion 211b and is installed so that an optical axis of the light is in a same direction as the extension direction of the lens portion 210.

Due to this, the light irradiated from the light source 400 moves to the lens portion 210 through the light guide portion 211b, and thus the light can move smoothly along the extension direction of the lens portion 210. That is, since the light guide portion 211b extends collinearly with the extension direction of the lens portion 210, and the light source 400 is installed so that the optical axis of the light is in the same direction as the extension direction of the lens portion 210, the light incident through the light guide portion 211b moves in a straight line toward the lens portion 210, and thus the light can smoothly arrive at the region that gets away from the incident portion 211 inside the lens portion 210.

Meanwhile, as illustrated in FIG. 7, the incident portion 211 extends in an orthogonal direction to the lens portion 210, and has one side to which the light of the light source 400 is incident and the other side on which a total reflection surface 211c totally reflecting the light toward the lens portion 110 is formed.

As described above, since the incident portion 211 and the lens portion 210 are formed to cross each other in the orthogonal direction thereof, and the total reflection surface 211c is formed on the connection region between the incident portion 211 and the lens portion 210, the light irradiated from the light source 400 is incident through the incident portion 211, and then is reflected and scattered by the total reflection surface 211c to move toward the lens portion 210. That is, in case that the light irradiated from the light source 400 directly moves to the lens portion 210, a hot spot may occur on the corresponding region to form heterogeneity. Accordingly, since the incident portion 211 extends in the orthogonal direction to the lens portion 210 and the total reflection surface 211c is formed on the other side connected to the lens portion 210, the light irradiated from the light source 400 is scattered by the total reflection surface 211c and moves toward the lens portion 110, and thus the hot spot phenomenon is prevented from occurring on the lens portion 110.

Meanwhile, as illustrated in FIG. 8, the grille portion 110 is coupled to the front side of the lens portion 210, the support portion 310 is coupled to the rear side of the lens portion 210, and the grille portion 110 and the support portion 310 are disposed not to overlap each other in back and forth directions of the lens portion 210.

That is, since the grille portion 110 is coupled to the front side of the lens portion 210 centering around the lens portion 210 and the support portion 310 is coupled to the rear side of the lens portion 210, the light moving inside the lens portion 210 is emitted toward the front around the grille portion 110, and a portion of the light emitted to the rear is reflected by the housing 300 to move again to the lens portion 210 or to be emitted forward thereof. Due to this, the emission efficiency of the light through the lens portion 210 is improved.

Here, the grille portion 110 may be laser-fused to the lens portion 210 to avoid the support portion 310 in the rear of the lens portion 210, and the support portion 310 may be laser-fused to the lens portion 210 to avoid the grille portion 110 in the front of the lens portion 210. That is, since the grille portion 110 and the support portion 310 do not overlap each other in back and forth directions in the lens portion 210, the grille portion 110 and the support portion 310 can be easily fused onto the lens portion 210 through the laser fusing. As can be viewed in FIG. 8, since the grille portion 110 and the support portion 310 do not overlap each other in the back and forth directions, when the grille portion 110 is fused onto the lens portion 210, the laser irradiated from the rear of the lens portion 210 can fuse the grille portion 110 onto the lens portion 210 to avoid the support portion 310, and when the support portion 310 is fused onto the lens portion 210, the laser irradiated from the front of the lens portion 210 can fuse the support portion 310 onto the lens portion 210 to avoid the grille portion 110.

According to various embodiments, as illustrated in FIG. 9, the support portion 310 includes a first end portion 311 and a second end portion 312 disposed to be spaced from each other in a width direction of the lens portion 210 and coupled to the rear side of the lens portion 210, and the first end portion 311 and the second end portion 312 may be formed to be recessed toward an opposite side of the lens portion 210. Here, the grille portion 110 may be disposed between the first end portion 311 and the second end portion 312 of the support portion 310 on the front side of the lens portion 210, and may be coupled to the lens portion 210.

That is, the first end portion 311 and the second end portion 312 of the support portion 310 coupled to the rear side of the lens portion 210 are disposed to be spaced from each other in the width direction of the lens portion 210, and the grille portion 110 is disposed between the first end portion 311 and the second end portion 312 on the front side of the lens portion 210 and is coupled to the lens portion 210, so that the grille portion 110 and the support portion 310 do not overlap each other in the back and forth directions centering around the lens portion 210. Here, the first end portion 311 and the second end portion 312 are formed to be recessed toward an opposite side of the lens portion 210, and when the light moving in the lens portion 210 moves to the recessed portion of the first end portion 311 and the second end portion 312, the light is reflected and moves on the recessed portion of the first end portion 311 and the second end portion 312, and thus the emission efficiency of the light being emitted through the lens portion 210 is secured. That is, since the light having moved to the recessed portion of the first end portion 311 and the second end portion 312 is reflected and re-incident to the lens portion 210, the emission amount of the light being emitted through the lens portion 210 is secured. Furthermore, the lens portion 210 may include an optic portion 213 for light reflection formed on a portion matching the recessed portion of the first end portion 311 and the second end portion 312 and including a plurality of projections or grooves, and thus the quantity of light being scattered by the optic portion 213 for light reflection and being emitted to the front of the lens portion 210 can be more secured. In case that the optic portion 213 for light reflection is formed in a position where the lens portion 210 and the grille portion 110 meet each other or in a position where the lens portion 210 and the support portion 310 meet each other, it may act as a factor that inhibits fusion, and thus the optic portion 213 for light reflection is formed only in the recessed portion of the first end portion 311 and the second end portion 312.

Meanwhile, as another exemplary embodiment of the present invention, as illustrated in FIG. 10, the support portion 310 may include connection end portions 313 coupled to both end portions in a width direction of the lens portion 210 on the rear side of the lens portion 210 and a recessed end portion 314 forming a recessed space by connecting the respective connection end portions 313.

As described above, since the support portion 310 is coupled to the lens portion 210 through the connection end portions 313 and forms the space in which the recessed end portion 314 is recessed, the light being emitted rearward through the lens portion 210 is reflected inside the recessed end portion 314 and is re-incident to the lens portion 210, and thus the light efficiency is improved. Furthermore, since the recessed end portion 314 extends equally in the width direction of the lens portion 210, most of the light being emitted rearward through the lens portion 210 can be reflected and move again forward thereof. Due to this, since the most of the light moving through the lens portion 210 is emitted forward, the light efficiency is improved.

Furthermore, since the lens portion 210 includes the optic portion 213 for light reflection formed on the portion matching the recessed end portion 314 and including a plurality of projections or grooves, the light moving in the lens portion 210 is scattered by the optic portion 213 for light reflection, and can be smoothly emitted forward thereof. Furthermore, since the light is scattered and reflected even in the connection end portions 313 and the recessed end portion 314 of the support portion 310, the light is re-incident into the lens portion 210 to secure the light efficiency, and since the light moves in the space by the connection end portions 313 and the recessed portion 314, the time that the light stays is increased to maintain the lighting through the grille portion 110.

The lighting apparatus of the grille for the automobile including the above-described structure upgrades the grille by turning on the light through the grille of the vehicle and making the light spread softly in the rear of the grille, and is favorable to the layout through reduction of the lighting structure of the light.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lighting apparatus of a grille for a vehicle, the lighting apparatus comprising:
   a grille panel including a grille portion having a plurality of pattern holes;
   a lens panel including a lens portion mounted at a rear end portion of the grille panel and equally formed with a shape of a partial area or a whole area of the grille portion, and configured to make light move inside thereof and to make a portion of the light emitted to outside thereof when the light is incident thereto; and
   a housing including a support portion mounted on a rear side of the lens panel and equally formed with the lens panel, and provided with a light source irradiating the lens panel with the light,
   wherein the grille portion is coupled to a front side of the lens portion, the support portion is coupled to a rear side of the lens portion, and the grille portion and the support portion are disposed not to overlap each other in back and forth directions of the lens portion.

2. The lighting apparatus according to claim 1, wherein the lens portion includes an incident portion formed on a side of the lens portion to make the light of the light source penetrate and be incident to inside of the lens portion.

3. The lighting apparatus according to claim 2, wherein an optic portion for the light emission including a plurality of projections or grooves is formed on the rear side of the lens portion.

4. The lighting apparatus according to claim 3, wherein the plurality of projections or grooves of the optic portion for the light emission have intervals being narrowed or sizes being increased in a direction in which the optic portion gets away from the incident portion.

5. The lighting apparatus according to claim 1, wherein the grille portion is fused to the lens portion to avoid the support portion in a rear of the lens portion, and the support portion is fused to the lens portion to avoid the grille portion in a front of the lens portion.

6. The lighting apparatus according to claim 1, wherein the support portion includes a first end portion and a second end portion disposed to be spaced from each other in a width direction of the lens portion and coupled to the rear side of the lens portion, and the first end portion and the second end portion are formed to be recessed toward an opposite side of the lens portion.

7. The lighting apparatus according to claim 6, wherein the first end portion, the grille portion and the second end portion are disposed in series in the width direction of the lens portion.

8. The lighting apparatus according to claim 6, wherein the lens portion includes an optic portion for light reflection formed on a portion matching recessed portions of the first end portion and the second end portion and including a plurality of projections or grooves.

9. The lighting apparatus according to claim 6, wherein the grille portion is disposed between the first end portion and the second end portion of the support portion on the front side of the lens portion and coupled to the lens portion.

10. The lighting apparatus according to claim 1, wherein the support portion includes:
- first and second connection end portions coupled to first and second end portions of the lens portion, respectively, in a width direction of the lens portion on the rear side of the lens portion; and
- a recessed end portion forming a recessed space between the support portion and the lens portion by connecting the first and second connection end portions.

11. The lighting apparatus according to claim 10, wherein the lens portion includes an optic portion for light reflection formed on a portion matching the recessed end portion and including a plurality of projections or grooves.

12. The lighting apparatus according to claim 10, wherein the grille portion is disposed between the first and second connection end portions of the support portion in the width direction of the lens portion.

13. A lighting apparatus of a grille for a vehicle, the lighting apparatus comprising:
- a grille panel including a grille portion having a plurality of pattern holes;
- a lens panel including a lens portion mounted at a rear end portion of the grille panel and equally formed with a shape of a partial area or a whole area of the grille portion, and configured to make light move inside thereof and to make a portion of the light emitted to outside thereof when the light is incident thereto; and
- a housing including a support portion mounted on a rear side of the lens panel and equally formed with the lens panel, and provided with a light source irradiating the lens panel with the light,
- wherein the lens portion includes an incident portion formed on a side of the lens portion to make the light of the light source penetrate and be incident to inside of the lens portion,
- wherein an optic portion for the light emission including a plurality of projections or grooves is formed on a rear side of the lens portion, and
- wherein the plurality of projections or grooves of the optic portion for the light emission have intervals being narrowed or sizes being increased in a direction in which the optic portion gets away from the incident portion.

14. The lighting apparatus according to claim 13, wherein the grille portion is formed to have a width being smaller than a width of the lens portion, and the light moving through the lens portion is emitted around the grille portion.

15. The lighting apparatus according to claim 13,
- wherein the incident portion includes an optic portion for light diffusion, and
- wherein the optic portion for the light diffusion has a plurality of projections or grooves.

16. The lighting apparatus according to claim 13, wherein the grille portion extends in an intersectional direction and forms the plurality of pattern holes,
- the lens portion is formed to be crossed as the lens portion is equally formed with a shape of the grille portion, and
- the incident portion is formed at an end portion of the lens portion to form at least a lens portion.

17. The lighting apparatus according to claim 16, wherein at least a light source is provided on respective incident portions in accordance with the at least a lens portion extending from the respective incident portions.

18. The lighting apparatus according to claim 16, wherein a light guide portion extending collinearly with an extension direction of the lens portion is formed on the incident portion, and
- the at least a light source is disposed to face the light guide portion and is installed so that an optical axis of the light is in a same direction as the extension direction of the lens portion.

19. The lighting apparatus according to claim 16, wherein the incident portion extends in an orthogonal direction to the lens portion, and has a first side to which the light of the light source is incident and a second side on which a total reflection surface totally reflecting the light toward the lens portion is formed.

* * * * *